United States Patent Office 2,926,130
Patented Feb. 23, 1960

2,926,130

HYDROCARBON CONVERSION CATALYST FOR USE IN THE HYDROCRACKING OF HYDROCARBON OILS

Robert J. Hogan, Bartlesville, Okla., assignor to Phillips Petroleum Company, a corporation of Delaware No Drawing. Application November 12, 1957
Serial No. 695,551

9 Claims. (Cl. 208—110)

This invention relates to an improved hydrocarbon conversion catalyst. In one aspect, the invention is concerned with a supported catalyst containing nickel and silver. In another aspect, the invention is concerned with a method of hydrocracking heavy oils. In another specific aspect, the invention is concerned with a supported nickel catalyst containing extremely small amounts of silver as a promoter.

In the hydrocracking of heavy oils, the main objective is to obtain a good conversion of the heavy oils to lower boiling materials. Almost as important an object is to obtain a high desulfurization of the oil during the hydrocracking reaction. I have developed a catalyst which has improved characteristics in hydrocracking of heavy oils.

It is an object of my invention to provide an improved catalyst. Another object is to provide an improved hydrocracking catalyst which has both high cracking and high desulfurization activity in the hydrocracking of heavy oils. A further object is to provide an improved process for the conversion of hydrocarbon to more valuable fluid hydrocarbons. It is also an object of the invention to provide an improved process for hydrocracking heavy oils. Other objects of the invention will become apparent from a consideration of the accompanying disclosure.

My improved catalyst comprises nickel with silver as a promoter, deposited on a porous support. Suitable supports are alumina, silica-alumina, fluorine-containing alumina, kieselguhr and bauxite. The catalyst of my invention has an excellent balance of properties when employed in the hydrocracking of heavy oils, giving both excellent conversions to more valuable lower boiling hydrocarbons and high desulfurizations.

The catalyst comprises 1 to 10 weight percent nickel together with 0.01 to 10 weight percent silver, and the balance a porous support. A particularly suitable support has been found to be gamma-alumina. A particularly advantageous catalyst has been found to be a catalyst comprising 1 to 10 weight percent nickel with 0.01 to 0.1 weigth percent silver, with the balance being a porous support, for instance, alumina. It has been found that this latter catalyst, containing only trace amounts of silver, gives high conversion and excellent desulfurization in hydrocracking of heavy oils when compared to a supported nickel catalyst containing no silver. In the catalyst of my invention, each of the silver and nickel constituents can be present as the metal, an oxide, or a sulfide, or as mixtures.

The catalyst can be prepared by impregnating the porous support with a solution of a salt of nickel and a solution of a salt of silver. Suitable salts are, for instance, nickel nitrate and silver nitrate. A single solution of the two salts can be employed to impregnate the support, or the support can be first impregnated with one of the salts such as nickel salt and can thereafter be impregnated with the other salts such as the silver salt. The impregnated support is then dried and then calcined for several hours at a temperature, for insance, of from 900 to 1100° F.

The catalysts of my invention so prepared is a mixture of silver oxide and nickel oxide on the support, such as alumina. The catalyst can be employed in this form for hydrocracking, or it can be reduced with hydrogen at a temperature in the range of from 700 to 1000° F. to obtain a catalyst containing these metals in the metallic state or as a mixture of the metals and their oxides. If the hydrogen contains hydrogen sulfide, the metals can be obtained in the form of their sulfides, or as a mixture of the metals and sulfides, or as a mixture of the metals, the sulfides, and the oxides, depending upon the extent of the treatment. All of the various forms of the catalyst, when charged as the catalyst to a hydrocracking process are effective catalysts, although the state of oxidation of the metals silver and nickel undoubtedly changes during the hydrocracking process.

When the catalyst having Ni and Ag in the form of the oxides is employed in a hydrocracking reaction with a feed containing no sulfur, the catalyst is believed to become a mixture of metals and oxides during the reaction, or to become entirely reduced to the metals. When sulfur is present in the feed Ni and Ag can be in the form of a mixture of metals, oxides, and sulfides, or mainly as sulfides with minor amounts of the metals or oxides depending upon the extent of time of contact, amount of sulfur, etc. The catalyst can also be charged initially with the Ni and Ag in the form of metals, or sulfides.

Various types of porous aluminas and silica-aluminas from a number of sources can be employed as the base support of the catalyst. Synthetic alumina gel, synthetic silica-alumina gel, partially dehydrated naturally occurring hydrous alumina, as well as precipitated alumina trihydrate, can be employed as support for the other constituents of the catalyst.

The catalyst is particularly useful for the hydrocracking, that is, the destructive hydrogenation in the presence of hydrogen, hydrocarbon constituents boiling above 850° F., such as those present in heavy residuum or topped crudes to convert heavy constituents boiling above 850° F. to gas-oils. At the same time, when the feed contains sulfur compounds, a high degree of desulfurization is effected. The feeds are usually topped to remove at least the materials boiling up to 400° F. The range of operating conditions for hydrocracking with this catalyst employing such feeds are:

| | Broad | Preferred |
|---|---|---|
| Temperature, ° F | 700–1,000 | 800–900 |
| Pressure, p.s.i.g. | 500–5,000 | 1,000–2,000 |
| LHSV [1] | 0.1–10 | 0.5–2.0 |
| Hydrogen, s.c.f./bbl | 1,000–10,000 | 2,000–6,000 |

[1] Liquid hourly space velocity.

The heavy residuum or topped crude feeds often contain up to about 4 weight percent sulfur; in some cases higher percentages of sulfur are present.

After use of the catalyst for a period of time, coke will build up thereon and is regenerated by burning it off, as will be understood. Regeneration temperatures are suitably in the range from 900 to 1100° F.

The following specific examples show the advantages of the catalysts of the invention.

Fixed beds of various catalysts in pellet form were employed to hydrocrack 400° F. + topped Wafra crude containing 3.6 weight percent sulfur. Operating conditions were 1000 p.s.i.g., 1 LHSV, 2000 cubic feet hydrogen per barrel of oil and 850° F.

TABLE I

| Catalyst No. | 1 | 2 | 3 | 4 |
|---|---|---|---|---|
| Ni Conc., wt. percent | 4.6 | 4.2 | 5 | 7 |
| Ag Conc., wt. percent | 0.03 | 7.4 | none | none |
| Temperature, °F | 850 | 854 | 850 | 850 |
| Conversion of 850° F.+, percent [1] | 66 | 87 | 57 | 54 |
| Desulfurization, percent | 89 | 74 | 36 | 38 |

[1] Conversion to materials boiling below 850° F.

The catalysts shown in Table I were prepared as follows:

Catalyst No. 1 was prepared as follows: 124 grams of nickel nitrate, $Ni(NO_3)_2 \cdot 6H_2O$, was dissolved in 100 cc. of water, and 0.365 gram of silver nitrate was dissolved in 50 cc. of water. These two solutions were combined and diluted to 200 cc. with water. This solution was used to impregnate gamma alumina having a surface area of 186 sq. m./gm. The impregnated gamma alumina was dried at 220° F. and calcined at 1000° F. overnight.

Catalyst No. 2 was prepared as follows: 110 grams $Ni(NO_3)_2 \cdot 6H_2O$ and 65 grams $AgNO_3$ were dissolved in water, and the resulting solution was diluted to 200 cc. Gel alumina pellets were dipped in the solution for 1.5 hours, dried at about 120° F. for one hour, and calcined at 1000° F. for two hours. The catalyst was then employed in a previous run and then regenerated by burning off coke in dry air at 900 to 1100° F. It was then used in the run summarized in Table I.

Catalyst No. 3 was prepared as follows: A support containing 90 weight percent silica and 10 weight percent alumina was impregnated with a solution prepared by dissolving 110.5 grams of nickel nitrate, $Ni(NO_3)_2 \cdot 6H_2O$, in 250 cc. water. After a period of soaking, 51.5 grams of ammonium carbonate dissolved in 250 cc. of water was added to make nickel carbonate in the pores of the support. The impregnated silica-alumina was dried at 250° F. and calcined at 1000° F. overnight. The surface area of the catalyst support was 340 sq. meters per gram.

Catalyst No. 4 was prepared as follows: A support of 95 weight percent alumina and 5 weight percent silica was impregnated with a solution of 220 grams of nickel nitrate dissolved in 250 cc. of water. After a soaking period the impregnated support was dried at 250° F. followed by calcining at 1000° F. overnight. The surface area of the catalyst support was 95 sq. meters per gram.

These data show that excellent conversions with concomitant high desulfurizations are obtained when using catalysts 1 and 2 of the invention, and that these catalysts give much higher conversions and more than twice the desulfurization obtained with supported nickel catalysts containing no silver.

As will be evident to those skilled in the art, various modifications of this invention can be made or followed in the light of the foregoing disclosure and discussion without departing from the spirit or scope of the disclosure or from the scope of the claims.

I claim:

1. A catalyst which comprises 1 to 10 weight percent Ni and 0.01 to 10 weight percent Ag deposited on a porous support, each of said Ag and said Ni being in the form of at least one of the group consisting of the metal, a metal oxide and a metal sulfide.

2. A catalyst which comprises 1 to 10 weight percent Ni and 0.01 to 10 weight percent Ag deposited on a porous support selected from the group consisting of alumina and silica-alumina, each of said Ag and said Ni being in the form of at least one of the group consisting of the metal, a metal oxide and a metal sulfide.

3. A catalyst of claim 2 where the support is gamma-alumina.

4. A catalyst which comprises 1 to 10 weight percent Ni promoted with 0.01 to 0.1 weight percent Ag deposited on a porous support selected from the group consisting of alumina and silica-alumina, each of said Ag and said Ni being in the form of at least one of the group consisting of the metal, a metal oxide and a metal sulfide.

5. A catalyst of claim 4 where the support is gamma-alumina.

6. A method of hydrocracking a heavy hydrocarbon oil which comprises contacting said oil with a catalyst comprising 1 to 10 weight percent Ni and 0.01 to 10 weight percent Ag deposited on a porous support selected from the group consisting of alumina and silica-alumina at a temperature in the range from 700 to 1000° F., a pressure in the range from 500 to 5000 p.s.i.g. and a liquid hourly space velocity of 0.1 to 10, in the presence of 1,000 to 10,000 of standard cubic feet of added $H_2$ per barrel of oil, each of said Ag and said Ni being in the form of at least one of the group consisting of the metal, a metal oxide and a metal sulfide.

7. A method of claim 6 wherein said support is gamma-alumina.

8. A method of hydrocracking and desulfurizing a heavy hydrocarbon oil containing sulfur which comprises contacting said oil with a catalyst comprising 1 to 10 weight percent Ni and 0.01 to 10 weight percent Ag deposited on a porous support selected from the group consisting of alumina and silica-alumina at a temperature in the range from 700 to 1000° F., a pressure in the range from 500 to 5000 p.s.i.g. and a liquid hourly space velocity of 0.1 to 10, in the presence of 1,000 to 10,000 of standard cubic feet of added $H_2$ per barrel of oil, each of said Ag and said Ni being in the form of at least one of the group consisting of the metal, a metal oxide and a metal sulfide.

9. A method of hydrocracking a heavy hydrocarbon oil which comprises said oil with a catalyst comprising 1 to 10 weight percent Ni and 0.01 to 0.1 weight percent Ag deposited on a porous support selected from the group consisting of alumina and silica-alumina at a temperature in the range from 700 to 1000° F., a pressure in the range from 500 to 5000 p.s.i.g. and a liquid hourly space velocity of 0.1 to 10, in the presence of 1,000 to 10,000 of standard cubic feet of added $H_2$ per barrel of oil, each of said Ag and said Ni being in the form of at least one of the group consisting of the metal, a metal oxide and a metal sulfide.

References Cited in the file of this patent

UNITED STATES PATENTS

| 2,010,982 | Dubbs | Aug. 13, 1935 |
| 2,307,421 | Overhoff | Jan. 5, 1943 |
| 2,369,009 | Block et al. | Feb. 6, 1945 |

FOREIGN PATENTS

| 425,893 | Great Britain | Mar. 18, 1935 |

UNITED STATES PATENT OFFICE
CERTIFICATE OF CORRECTION

Patent No. 2,926,130                                    February 23, 1960

Robert J. Hogan

It is hereby certified that error appears in the printed specification of the above numbered patent requiring correction and that the said Letters Patent should read as corrected below.

Column 4, line 44, after "comprises" insert -- contacting --.

Signed and sealed this 23rd day of August 1960.

(SEAL)

Attest:

KARL H. AXLINE
Attesting Officer

ROBERT C. WATSON
Commissioner of Patents